May 12, 1959 — J. G. DE FLON — 2,886,126
SCAVENGABLE WATER DELIVERY DUCTS FOR COOLING TOWERS
Filed April 9, 1956 — 2 Sheets-Sheet 1

JAMES G. DE FLON
INVENTOR.

ATTORNEY

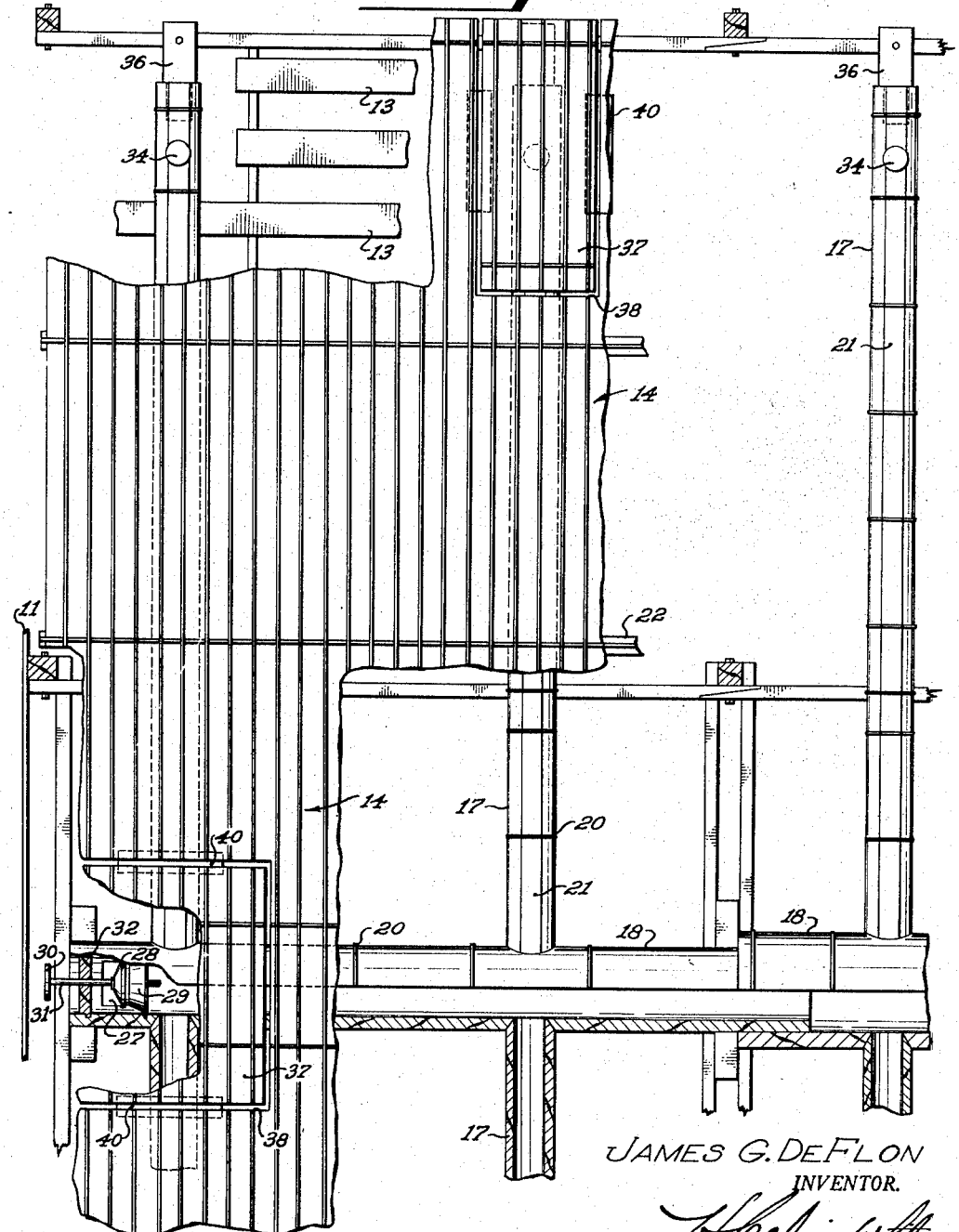

2,886,126

SCAVENGABLE WATER DELIVERY DUCTS FOR COOLING TOWERS

James G. De Flon, Whittier, Calif., assignor to The Fluor Corporation, Ltd., Los Angeles, Calif., a corporation of California Application April 9, 1956, Serial No. 577,147

6 Claims. (Cl. 183—26)

This invention relates generally to fluid circulation systems utilized in fluid cooling towers, and more particularly has to do wth the maintenance of such systems in fully operative condition for extended periods of time, thereby reducing or minimizing the risk of interruptions in tower operation and reductions in fluid circulation such as restrict the fluid cooling efficiency of such towers.

In the operation of fluid cooling towers, typically of the forced or natural draft type in which water is discharged through spaced nozzles or openings in the upper portion of the tower chamber for contact with cooling air and subsequent collection at the bottom of the tower, it is oftentimes found that water discharge through nozzles or openings is reduced or stopped with the result that the cooling efficiency of the tower is lowered. The primary cause of nozzle failure consists in the tendency of foreign particles and materials within the conduits to collect and clog the nozzles or openings preventing or interfering with water discharge. Past attempts to prevent such clogging, in the main confined to the provision of non-metallic conduits such as wooden headers and laterals branching therefrom, have been founded on the assumption that such clogging is caused primarily by the formation of scale and corrosion particles within metallic conduits and their subsequent breakage away from the conduit interiors for collection at the nozzles. However, even though wooden or other types of non-metallic conduits are substituted, the problem of nozzle clogging by loose material remains, since over extended periods of time potential clogging materials do find their way into water circulating systems.

The present invention is founded upon the concept of preventive maintenance of the water circulation system and especially the water delivery ducts of a cooling tower in a non-potentially clogging condition, the invention being directed to the provision of scavengable water delivery ducts incorporating strategically located outlets and valves therefor, permitting uninterrupted water discharge through the outlets and interrupted scavenging of water entrained solid materials from within the ducts into the tower chamber, where the entrainment drops to the bottom of the chamber.

The invention is in large part concerned with the relationship of entrainment discharge outlets and control valves therefor with respect to the arrangement of the water distributing headers and laterals in the upper chamber portion of a cooling tower and beneath drift or mist eliminator baffles in such manner that the valves may be periodically controlled by manipulation from above the baffles, in order that the entrainment may drop freely to the base of the tower. As will be brought out, the laterals have entrainment discharge outlets which are positioned below removable baffle sub-assemblies in the form of trap doors, which may be readily lifted to permit easy access to the valves from points above the drift eliminator baffles. In addition, periodic scavenging of the header or supply conduit may be accomplished by manipulation of a valve controlling discharge of entrainment from the header through an outlet located beyond the entrances to the laterals or branch conduits in the direction of water flow within the header, the header valve also being manipulable from above the drift eliminator baffles through an opening therein normally receiving a baffle sub-assembly in removable trap door form.

Other objects and features of the invention as well as the details of an illustrative embodiment, will be more fully understood from the following description of the drawings, in which:

Fig. 2 is a plan view taken from above the drift eliminator baffles which are broken away to show the locations of the water distributing conduits, entrainment discharge outlets and control valves;

Figure 1:
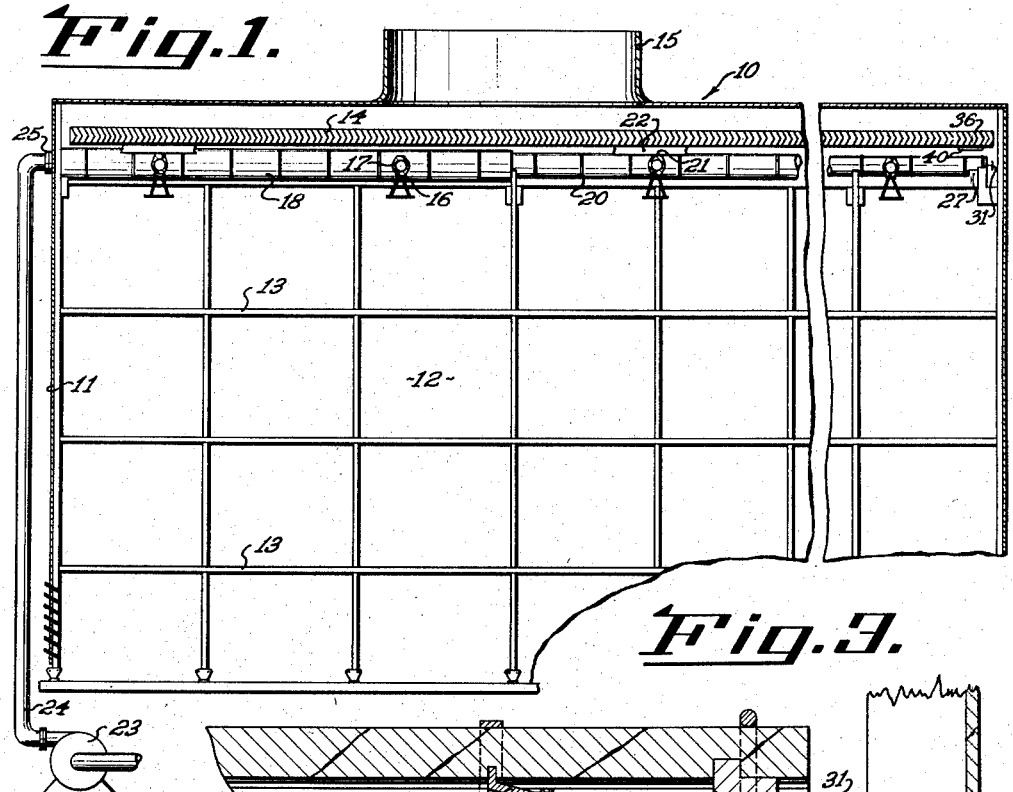
Fig. 1 is an elevation taken through the interior of a cooling tower showing the location of the water distributing conduits.
Figure 3:
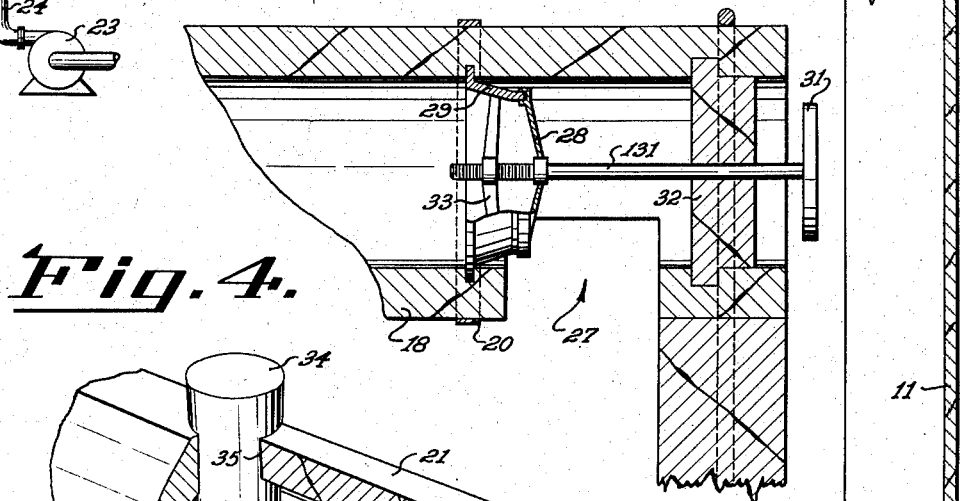
Fig. 3 is an enlarged section taken through the header or supply conduit and showing its entrainment discharge outlet in detail.

A typical water cooling tower is shown at 10 to include side walls 11 enclosing a chamber 12 within which air passes upwardly in cooling relation with water splashing downwardly over horizontal grid decks 13 located at various elevations within the chamber. The small particles of water entrained by the rising air are segregated therefrom by the drift eliminator baffles 14 extending across the upper portion of the chamber and deflecting the rising air so that it loses its water content and discharges upwardly through the stack 15 at the top of the tower.

Water to be cooled is introduced into the chamber 12 typically through spray nozzles 16 connected into the laterals or branch conduits 17 at spaced intervals in order that the distribution of water within the chamber 12 may be substantially uniform. The latter condition requires that all of the nozzles be in efficient operating condition, implying that the nozzles be free of clogging materials or particles.

Water is supplied at the laterals 17 through a header or supply conduit 18 to which the branch conduits are connected at spaced intervals, the header normally including successively reduced diameter sections in the direction of water flow therein in order to compensate for reduced quantities of water delivered to down-stream branch conduits as a result of previous supply of water to up-stream branch conduits, so that water pressure in all the branch conduits may be maintained substantially the same. Both the branch and supply conduits are shown to comprise wooden pipes reinforced by encircling metal bands or wires 20, and the branch conduits 17 are conveniently formed to have flat tops 21 for receiving supports 22 connected with the undersides of the drift eliminator baffles for supporting the latter. Water is supplied to the header 18 by a pump 23 discharging into the up-right pipe run 24 which delivers to the header entrance 25.

In order that the header 18 may be periodically scavenged to remove loose foreign material finding its way into or forming within the header, a relatively large discharge opening 27 is formed near the end of the header furthest from its entrance 25 and down-stream of the entrances to the laterals 17, the opening facing downwardly for downward discharge of entrainment therethrough. A suitable valve 28 is positioned within the end portion of the header for axial displacement toward and away from a drum-type valve seat 29 also located within the header and circumferentially connected with the interior wall of the header up-stream of the opening 27. Opening and closing of the valve is controlled by rotation of the exposed handle 31 located between the end of the header and the wall of the tower and connected with an axial stem 31 mounting the valve. The stem also passes through a bulkhead 32 closing off the end of the header and is in threaded engagement with a spider 33 carried interiorly of the seat 29, so that rotation of the handle 30 causes axial displacement of the stem 31 and the valve 28 away from the annular seat 29, in controlling relation with discharge of entrainment through the seat and the discharge opening 27.

Figure 4:
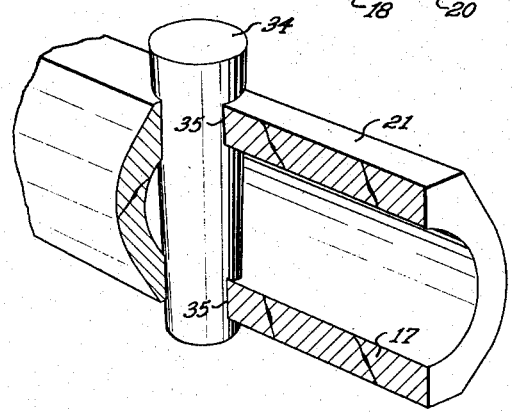
Fig. 4 is a perspective view partly in section showing a typical entrainment discharge outlet and control valve for a lateral or branch conduit.

Downward discharge of entrainment from the end portions of the laterals 17 is controlled by tapered, plug-type valves 34, shown in Figs. 2 and 4, which seat downwardly through upper and lower openings 35 formed in the laterals. The ends of the latter are normally permanently closed by plugs 36 projecting therefrom and connected with the side of the tower in supporting relation with the lateral ends. Upon removal of one or more of the plug valves 34 from the openings 35, water entrained solid material within the laterals is carried toward and through the lower openings 35 for discharge into the tower chamber. Selective scavenging of the laterals and/or the supply conduit may be accomplished by removing selected plug valves 34 and manipulating valve 28 as desired, it being contemplated that only one lateral at a time or the supply conduit be scavenged in order to maintain maximum pressure of the scavenging water for more efficient discharge of entrainment.

An examination of Fig. 2 will show that the plug valve 34 and valve 28 are located near the ends of the conduits and the tower sides, and in such relation with the grid decks 13 that entrainment dropping or discharging from the outlets falls freely to the bottom of the tower chamber, without buildup of debris and loose material on the grid decks. Furthermore, access to the valves is made convenient by the location of drift eliminator baffle subassemblies 37 directly above the valves, the baffle subassemblies being normally removably supported by the main baffle assembly 14 within sufficiently sized openings 38 formed therein. When it is desired to manipulate the valves, it is only necessary to climb to the top of the tower to vantage points above the baffle assembly 14 and remove each baffle sub-assembly 37 in order to reach down through the openings 38 and manipulate the valves, which are located within reaching distance from above the main baffle assembly.

I claim:

1. In a water cooling tower, the combination comprising a vertically extending cooling chamber within which water passes downwardly in contact with rising air, said chamber having vertical walls, spaced branch conduits within the upper portion of said chamber and a supply conduit for receiving circulating water and delivering it to the entrances of the branch conduits, said branch conduits having spaced therealong in the direction of water flow therein a plurality of relatively restricted outlets for distributing water from within the conduits into the rising air and relatively large outlets spaced beyond the restricted outlets in said directions for discharging water entrained solid material from within the conduits into the chamber to drop downwardly therein for water collection at the base of the tower, said supply conduit having a relatively large downwardly facing outlet spaced beyond the entrances to the branch conduits in the direction of water flow through the supply conduit for discharging water entrained solid material from within the supply conduit downwardly into the chamber, valve means mounted in opening and closing relation with said branch and supply conduit large outlets for controlling interrupted discharge of said entrainment therethrough, means for circulating water to said supply conduit, and structure directly overlying said branch and supply conduits and forming openings through which access to the valves may be had from above said structure for controlling said discharge, the valve means for controlling entrainment discharge through said supply conduit outlet being everywhere confined below the level of said overlying structure and including a rotary control handle between the end of the supply conduit and said chamber wall, a stem projecting through the end of said supply conduit, and a valve movable within the supply conduit over said enlarged opening therein in response to rotation of said central handle.

2. The invention as defined in claim 1 in which the valve means for controlling entrainment discharge through said branch conduit large outlets comprise vertically elongated and downwardly tapering plugs, said plugs being upwardly removable from said branch conduit outlets.

3. In a water cooling tower containing a vertically extending cooling chamber within which water passes downwardly in contact with rising air, the combination comprising a conduit extending laterally within the upper portion of said chamber, said conduit having spaced therealong in the direction of water flow therein a plurality of relatively restricted outlets for distributing water from within the conduit into the rising air and a relatively large outlet spaced beyond the restricted outlets in said direction discharging water entrained solid material from within the conduit into the chamber to drop downwardly therein for water collection at the base of the tower, valve means mounted in opening and closing relation with said large outlet for controlling interrupted discharge of said entrainment therethrough, means circulating water to said conduit for delivery to said outlets, and baffles extending within the upper portion of said chamber proximately above said conduit for separating water entrainment from the rising air, said baffles forming above said valve means an opening through which access to the valve means may be had from above the baffles for controlling said discharge.

4. In a water cooling tower containing a vertically extending cooling chamber within which water passes downwardly in contact with rising air, the combination comprising a plurality of conduits extending laterally within the upper portion of said chamber, said conduits having spaced therealong in the directions of water flow therein a plurality of relatively restricted outlets for distributing water from within the conduits into the rising air and relatively large outlets spaced beyond the restricted outlets in said directions discharging water entrained solid material from within the conduits into the chamber to drop downwardly therein for water collection at the base of the tower, separate valves mounted in opening and closing relation with said large outlets for controlling interrupted discharge of said entrainment therethrough, means circulating water to said conduits for delivery to said outlets, and baffles extending within the upper portion of said chamber proximately above said conduits for separating water entrainment from the rising air, said baffles forming above said valves separate openings through which access to the valves may be had from above the baffles for controlling said discharge.

5. In a water cooling tower containing a vertically extending cooling chamber within which water passes downwardly in contact with rising air, the combination comprising spaced branch conduits within the upper portion of said chamber and a supply conduit receiving circulating water and delivering it to the entrances of the branch conduits, said branch conduits having spaced therealong in the direction of water flow therein a plurality of relatively restricted outlets for distributing water from within the conduits into the rising air and relatively large outlets spaced beyond the restricted outlets in said directions discharging water entrained solid material from within the conduits into the chamber to drop downwardly therein for water collection at the base of the tower, said supply conduit having a relatively large outlet beyond the entrances to the branch conduits in the direction of water flow through the supply conduit for discharging water entrained solid material from within the supply conduit into the chamber, valve means mounted in opening and closing relation with said branch and supply conduit large outlets for controlling interrupted discharge of said entrainment therethrough, means circulating water to said supply conduit, and a baffle assembly forming above the branch and supply conduit valves openings through which access to the valves may be had from above the assembly for controlling said discharge.

6. The invention as defined in claim 5 including baffle sub-assemblies removably received within said openings.

References Cited in the file of this patent

UNITED STATES PATENTS

| | | |
|---|---|---|
| 2,247,514 | Mart | July 1, 1941 |
| 2,356,192 | Yingling | Aug. 22, 1944 |
| 2,382,026 | Roche | Aug. 14, 1945 |